United States Patent [19]

Sowell

[11] Patent Number: 5,305,319
[45] Date of Patent: Apr. 19, 1994

[54] FIFO FOR COUPLING ASYNCHRONOUS CHANNELS

[75] Inventor: Richard Sowell, San Jose, Calif.

[73] Assignee: Chips and Technologies, Inc., San Jose, Calif.

[21] Appl. No.: 28,648

[22] Filed: Mar. 9, 1993

Related U.S. Application Data

[63] Continuation of Ser. No. 648,103, Jan. 31, 1991, abandoned.

[51] Int. Cl.⁵ ............................................. H04J 3/02
[52] U.S. Cl. ............................. 370/85.13; 370/85.9; 370/85.11; 370/91; 365/189.02; 365/189.04; 365/230.02
[58] Field of Search ................ 370/85.9, 85.11, 85.13, 370/85.14, 91; 365/189.02, 189.04, 230.02, 230.04, 230.05

[56] References Cited

U.S. PATENT DOCUMENTS

| | | | |
|---|---|---|---|
| 4,744,078 | 5/1988 | Kowalczyk | 370/85 |
| 4,805,139 | 2/1989 | Norris | 365/78 |
| 4,829,515 | 5/1989 | Donaldson et al. | 370/85.14 |
| 4,875,196 | 10/1989 | Spaderna et al. | 365/230.04 X |
| 4,954,987 | 9/1990 | Auvinen et al. | 365/189.02 |
| 5,001,671 | 3/1991 | Koo et al. | 365/230.02 X |
| 5,033,045 | 7/1991 | Ramel et al. | 370/85.13 |

OTHER PUBLICATIONS

IBM PC Advanced Troubleshooting & Repair Robert C. Brenner, Howard W. Sams & Company, 1988, "8237 Progrmmable DMA Controller (DMAC)".

Primary Examiner—Douglas W. Olms
Assistant Examiner—Russell W. Blum

[57] ABSTRACT

An efficient and optimized FIFO memory for use in a bus master system utilizes a multiplexing clock from which control signal defining bus cycles on asynchronous system and local buses. The FIFO facilitates interleaved access by system and local buses to support high speed data transfers from devices on one bus to the other bus.

6 Claims, 5 Drawing Sheets

FIFO FOR COUPLING ASYNCHRONOUS CHANNELS

This is a continuation of application Ser. No. 07/648,103, filed Jan. 31, 1991, now abandoned.

BACKGROUND OF THE INVENTION

In personal computers, the main system architecture bus provides the means for which subsystems communicate. An example of such a system architecture bus is IBM's Micro Channel Architecture.

In addition, a communications pathway is often needed between a local interface bus and the main system architecture bus. When data is transferred between a subsystem on the main system architecture bus and a device on a local interface bus, it is desirable and sometimes required to use a FIFO memory buffer in the data pathway between the two buses.

The use of a FIFO buffer provides a more capable data flow between the Micro Channel and local interfaces. It achieves this goal by adapting the data rate disparities and decoupling the interactions between the two buses. Furthermore, the FIFO buffer provides for efficient use of the Micro Channel bus by providing the capability of high speed block transfers and reduced arbitration overhead.

To achieve maximum utilization of limited silicon real estate and maximum data transfer performance, the FIFO must be implemented in an efficient and effective manner.

SUMMARY OF THE INVENTION

The present invention is an efficient, high performance FIFO memory for use in a bus master system coupling an asynchronous system bus and an asynchronous local bus. According to one aspect of the invention, the FIFO I/0 ports are time multiplexed between internal local and internal system buses using a first clock signal. This multiplexing allows for design techniques to be used that minimize required silicon area.

According to another aspect of the invention, the system and local bus cycles are controlled to facilitate the transfer of data between the FIFO memory and the system bus and the FIFO memory and the local bus during alternate phases of the first clock signal. The frequency of the first clock signal is twice the frequency of the maximum data transfer rate of the system bus to allow simultaneous high-speed interleaved data transfers between the system and local buses.

According to a further aspect of the invention, local bus cycles may occur concurrently and overlap indiscriminately with Micro Channel system bus cycles. This coexistence of system and local cycles and the ability to time multiplex accesses to the FIFO buffer provides for a small latency for initiating transfers.

According to a further aspect of the invention, a precharge/discharge cycle is executed in synchronism with the first clock signal to facilitate the use of a FIFO structure that optimizes the required silicon area for a performance level required to support the high-speed streaming mode of the Micro Channel.

According to a further aspect of the invention, a CMOS array FIFO utilizes a single address decoder to select words to be accessed and a mirrored SRAM cell utilizing only N-channel transistors for the data path.

Other advantages and features of the invention will become apparent in view of the appended figures and following detailed description.

DETAILED DESCRIPTION OF THE PREFERRED EMBODIMENTS

Figure 1:
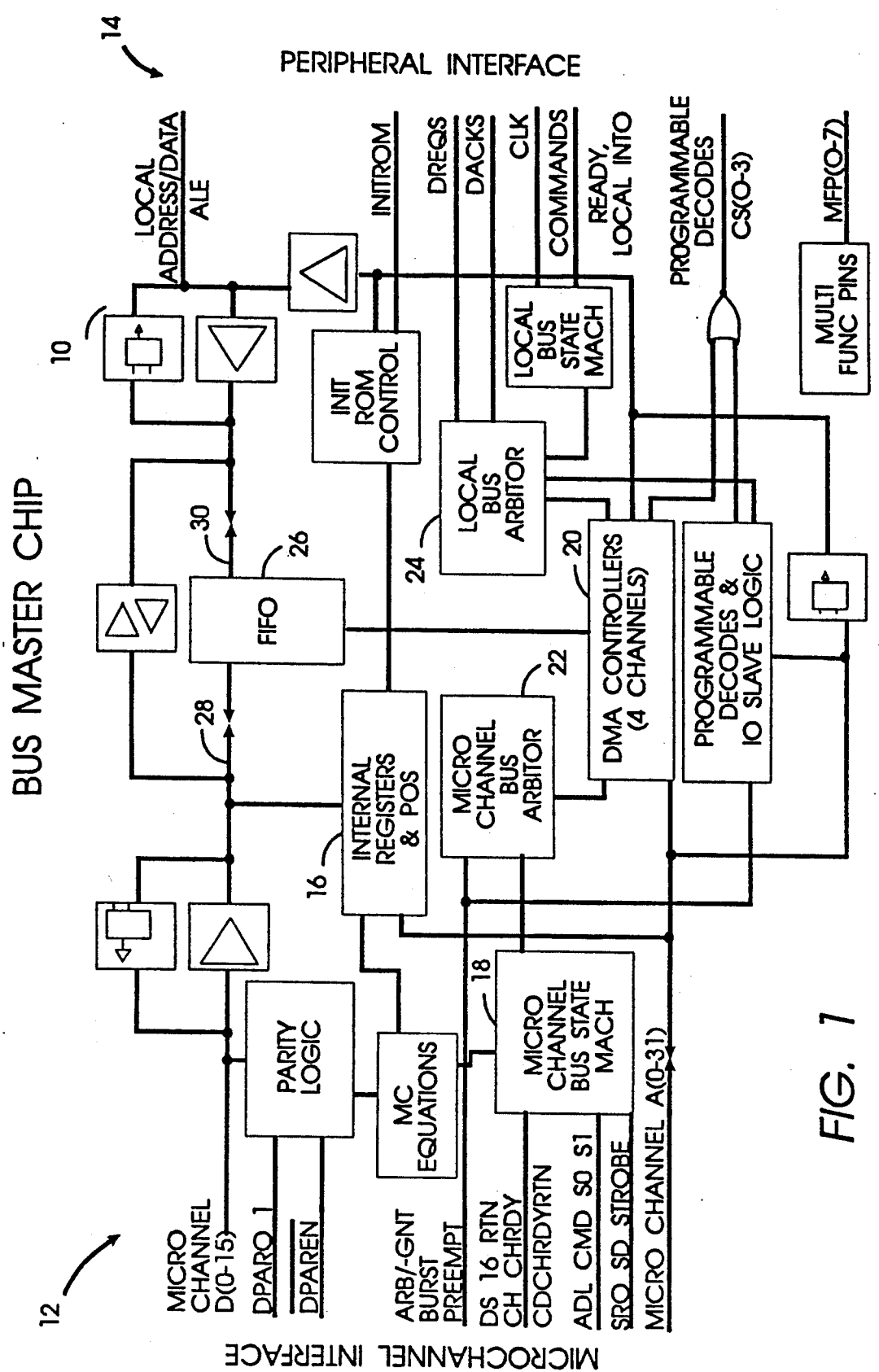
FIG. 1 is block diagram of a bus master system.

Referring to FIG. 1, a bus master system (BMS) 10 has a Micro Channel (MC) interface side 12 and a local (LOC) interface side 14. The bus master includes programmable registers 16 for configuring the BMS 10, an MC bus state machine 18 for generating control signals to implement MC bus cycles, MC side and LOC side direct memory access (DMA) controllers 20 (4 channels), MC channel and LOC bus arbiters 22 and 24, a FIFO memory 26 coupled to internal MC side and LOC side buses 28 and 30. Other elements such as drivers and decode logic are also depicted.

The design of the FIFO memory 26 is critical for high speed data transfers between I/0 devices on a local bus and memory or I/0 devices on the MC bus. In particular, in the MC streaming mode data may be transferred at high speed between the BMS 10 and a selected slave on the MC. During the streaming mode the FIFO 26 is very busy supporting data transfer between the FIFO and the MC side 12 but it is still able to support data transfer between the FIFO and the LOC side.

In the present system a unique time multiplexed FIFO 26 is utilized. Because the LOC side 14 supports peripheral side activity only, LOC bus timing from the local DMA is derived from the BMS's main input clock signal (CK40).

Likewise, because the MC side bus is considered an asynchronous bus, the MC side DMA also derives it bus timing signals from CK40 when acting as a bus master. When acting as a slave the BMS sees asynchronous signals from the Micro Channel architecture. Additionally, the signal for multiplexing the FIFO is derived from CK40. Because of this common clock signal congruency it is possible to design the FIFO 26 to interact synchronously with both the MC and LOC side DMAs to assign mutually exclusive access times to each DMA and to provide simultaneous MC and LOC DMA cycles and interleaved FIFO accesses.

Figure 2:
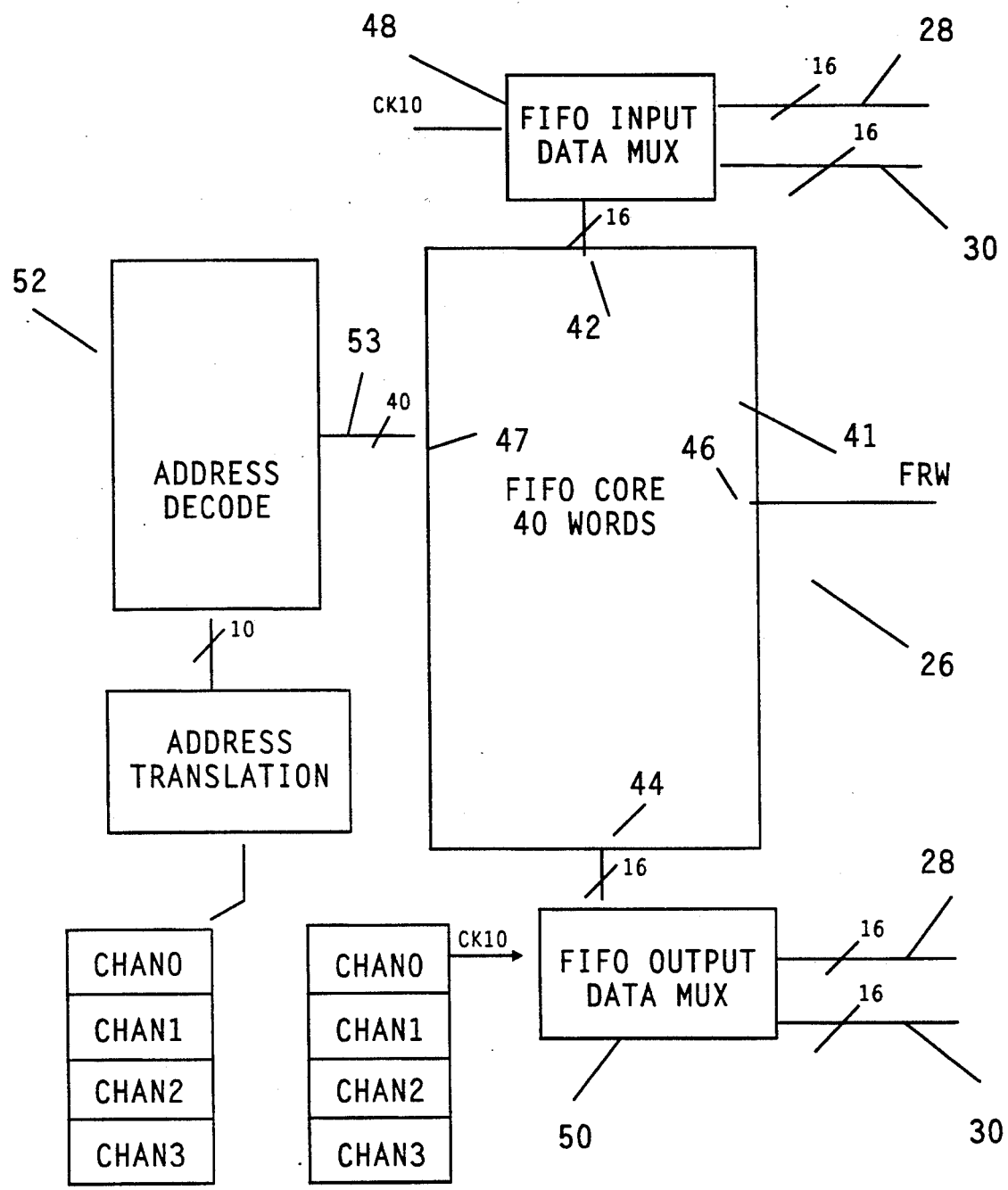
FIG. 2 is a schematic functional diagram of a FIFO memory unit utilized in the bus master system.

The operation of the FIFO will now be described with reference to FIGS. 2 and 3. In FIG. 2, the FIFO 26 includes a 40 word core 41 having a data input port 42, a data output port 44, a control input 46 for receiving a FIFO read/write signal (FRW), and address decode inputs 47 for selecting one of the 40 words in the core 41. A FIFO input data multiplexer (IMUX) 48 has first and second input ports coupled to the MC and LOC side internal buses 28 and 30 respectively and an output port coupled to the core input port 42. A FIFO output data multiplexer (OMUX) 50 has first and second output ports coupled to the MC and LOC side internal buses 28 and 30 respectively and an input port coupled to the core output port 44. Each MUX 48 and 50 has a control port coupled to a CK10 clock signal derived from CK40. An address decoder 52 receives FIFO word addresses, decodes the address, and selects one of the words in the core 41 by activating one of the 40 word select lines of a WORD SELECT bus 53 coupling the address decoder 52 to the address decode inputs 47.

Figure 3:
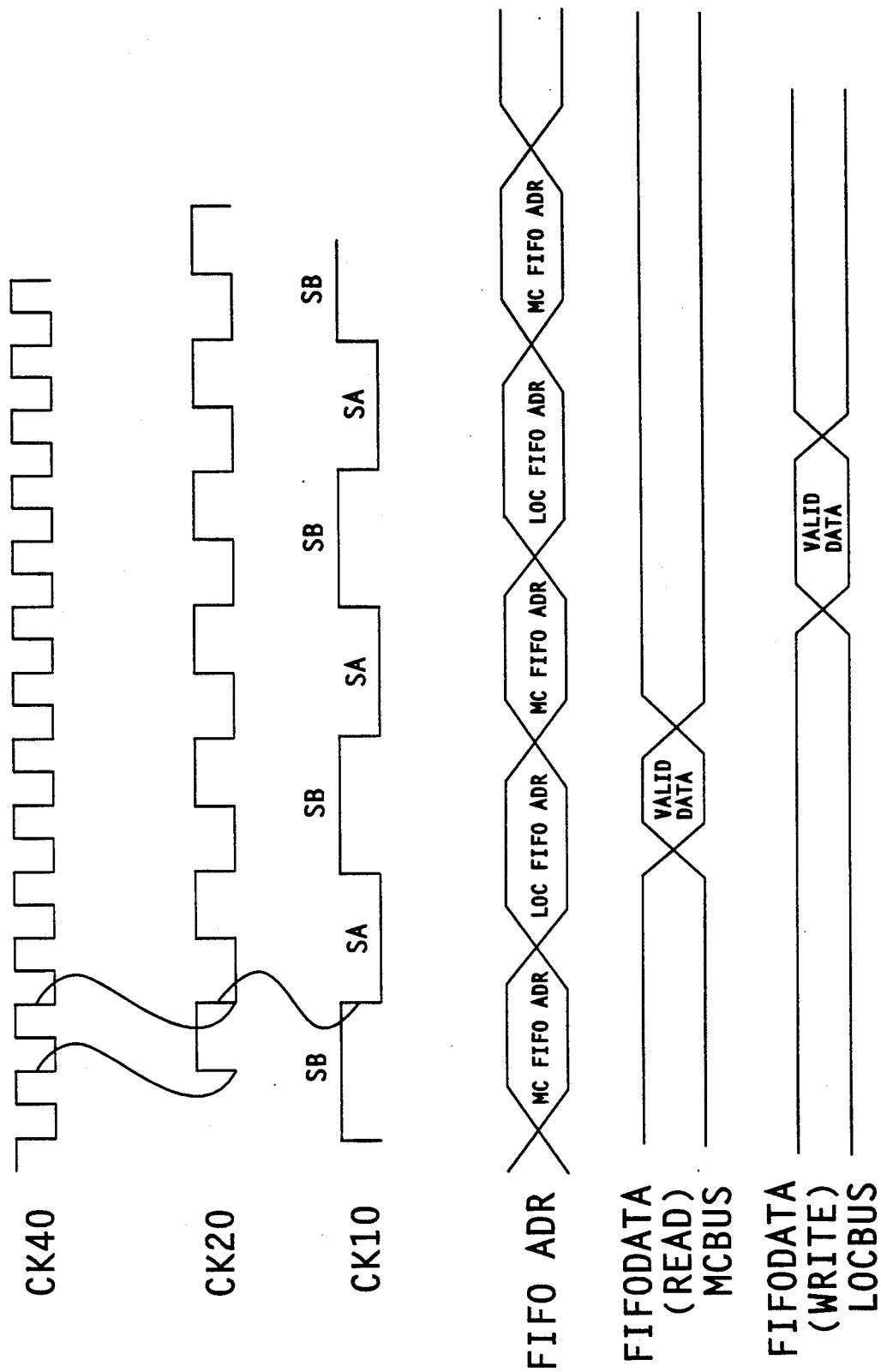
FIG. 3 is a timing diagram illustrating the operation of the FIFO memory unit.

In FIG. 3 the relationship of CK40, CK20, and CK10 is depicted. CK40 is the externally generated, 40 MHz signal provided to the BMS 10, CK20 is a 20 MHz signal derived from CK40, and CK10 is a 10 MHz signal derived from CK40. There is a slight skew between the signals to assure that CK10 transitions occur after CK20 transitions occur after CK40 transitions. Digital circuits for deriving these clock signals are well-known and will not be described herein.

The IMUX 48 couples its first input port to its output port and the OMUX 50 couples its first output port to its input port during CK10 high phases. The IMUX 48 couples its second input port to its output port and the OMUX 50 couples its second output port to its input port during CK10 low phases. Accordingly, data may be transferred between the FIFO and the MC side internal bus 28 when CK10 is high and data may be transferred between the FIFO and the LOC side internal bus 30 when CK10 is low. An MC FIFO address is provided to the address inputs during CK10 high and a LOC FIFO address is provided to the address inputs during CK10 low. The FRW signal is controlled to read or write FIFO data as required.

By way of example, the interleaved transfer of data for a Micro Channel streaming data cycle and a local cycle between the FIFO 26 and the MC and LOC sides 12 and 14 will now be described. The MC bus timing signals are generated by a state machine that makes transitions between states S0-S7 and SA and SD. Each state is of 50 nanosecond duration and begins at a negative edge of CK10 and ends at the immediately following negative edge of CK10. During the MC streaming data read and write modes one data word is transferred every 100 nanoseconds. A detailed description of the Micro Channel bus control signals and a state machine for generating MC timing signals is included in a commonly assigned patent application entitled SINGLE STATE MACHINE FOR IMPLEMENTING IBM MICROCHANNEL CYCLES, U.S. Pat. No. 07/648,102, filed on the same day as the present invention, which is hereby incorporated by reference.

During a streaming transfer the state machine causes transitions between SA and SB to occur where SA occurs during CK10 low and SB during CK10 high. The details of setting up streaming data cycles are described in the Micro Channel Specification.

Figure 5:
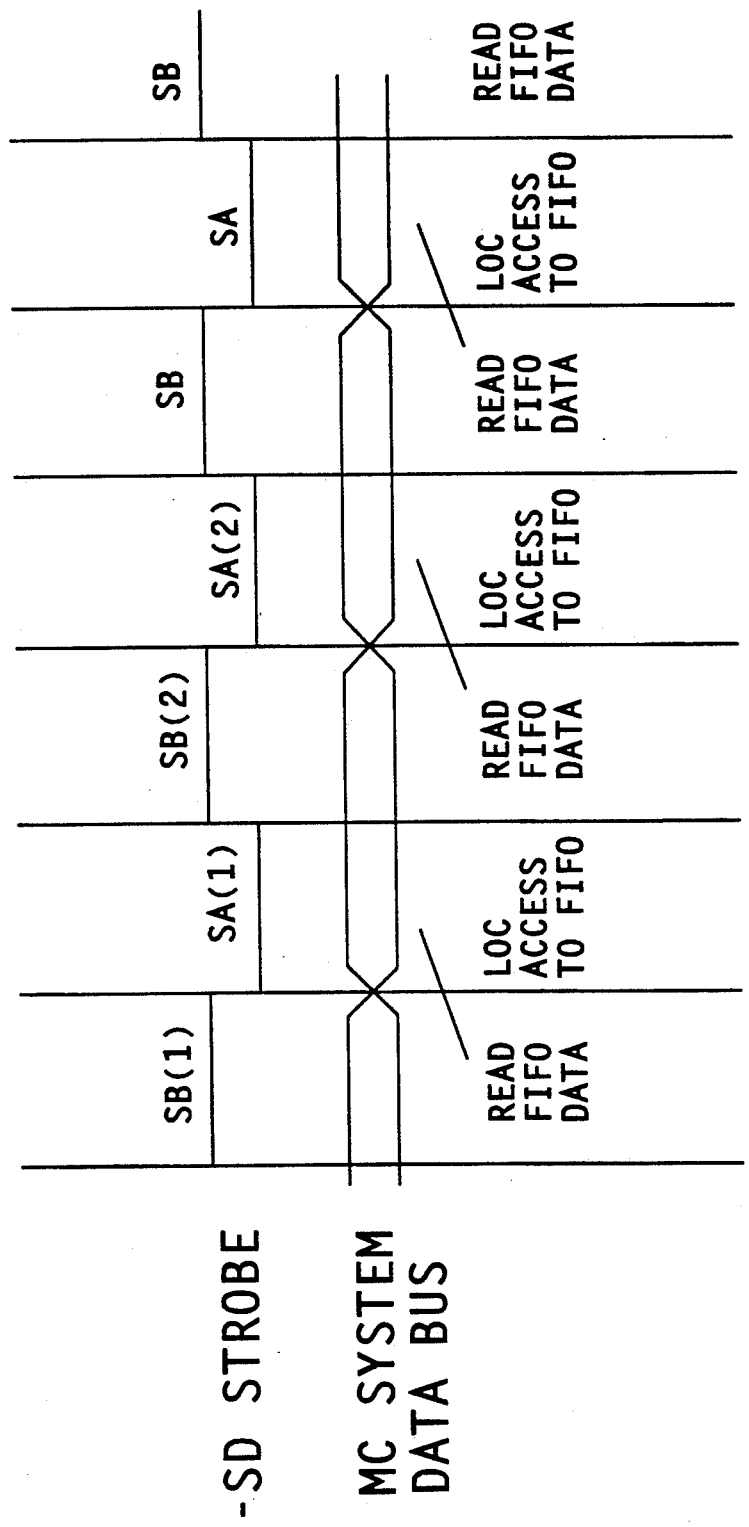
FIG. 5 is a timing diagram illustrating a streaming data WRITE operation.

FIG. 5 is a timing diagram illustrating the synchronization to the data streaming cycles to the FIFO access cycles defined by CK10. In FIG. 5, the −SD STROBE signal is synchronized to CK10. During a streaming data WRITE cycle, data is read from the FIFO 26 when the signal −SD STROBE is high, is written to memory or an I/O device on the MC bus. New data read from the FIFO core 41 is transferred to the MC system bus on every high-to-low transition of −SD STROBE. As depicted in FIG. 5, this high-to-low transition takes place at the beginning of each SA state.

Referring to a particular SA state (SA(1)), valid READ data is read from the FIFO 26 onto the internal MC side bus 28 during the SB state (SB(1)) that immediately precedes SA(1). This data is transferred to the MC system bus at the start of SA(1) and remains valid on the MC system bus during SA(1) and the immediately following SB state (SB(2)). During SA(1) the signal CK10 is low and the LOC side internal bus is coupled to the FIFO core 41.

Transfers between the LOC side bus and the FIFO core 41 can take place simultaneously with a high speed data streaming transfer between the FIFO core 41 and MC system bus. Thus, the pipelined nature of the streaming data WRITE cycle is illustrated. During the streaming data WRITE cycle, data is transferred from the FIFO 26 to the internal MC side bus during SB states because CK10 is high so that the OMUX 50 couples the output port of the core 41 to the MC internal side bus 28 and the FRW signal is asserted to read the FIFO data onto the MC internal side bus 28. During the following SA state the WRITE data is transferred to the MC system bus and written to MC slav while the internal LOC side bus is coupled to the input and output ports of the core 41.

Note that the MC side does not require access to the FIFO 26 during SA states. Accordingly, the LOC side has access to the FIFO during SA states and can read from or write to the FIFO 26 during these SA states. It is thus possible to simultaneously transfer data between the FIFO and local and MC sides, with the transfer rate to the MC side at 20 Megabytes per second, due to the unique interleaving of the transfers and synchronization of the bus timing signals with CK10.

Thus, the recognition that both the local and system bus blocks and the FIFO block can share a common timing provides for the establishment of synchronous interaction and data transfer between the blocks. The FIFO block can simultaneously supply data to both the system and local sides at the maximum data rate for both sides because the FIFO is multiplexed at twice the maximum data rate. The DMA cycles can be independently derived from FIFO accesses allowing indiscriminate overlapping of local and system DMA cycles for optimum performance.

Figure 4:
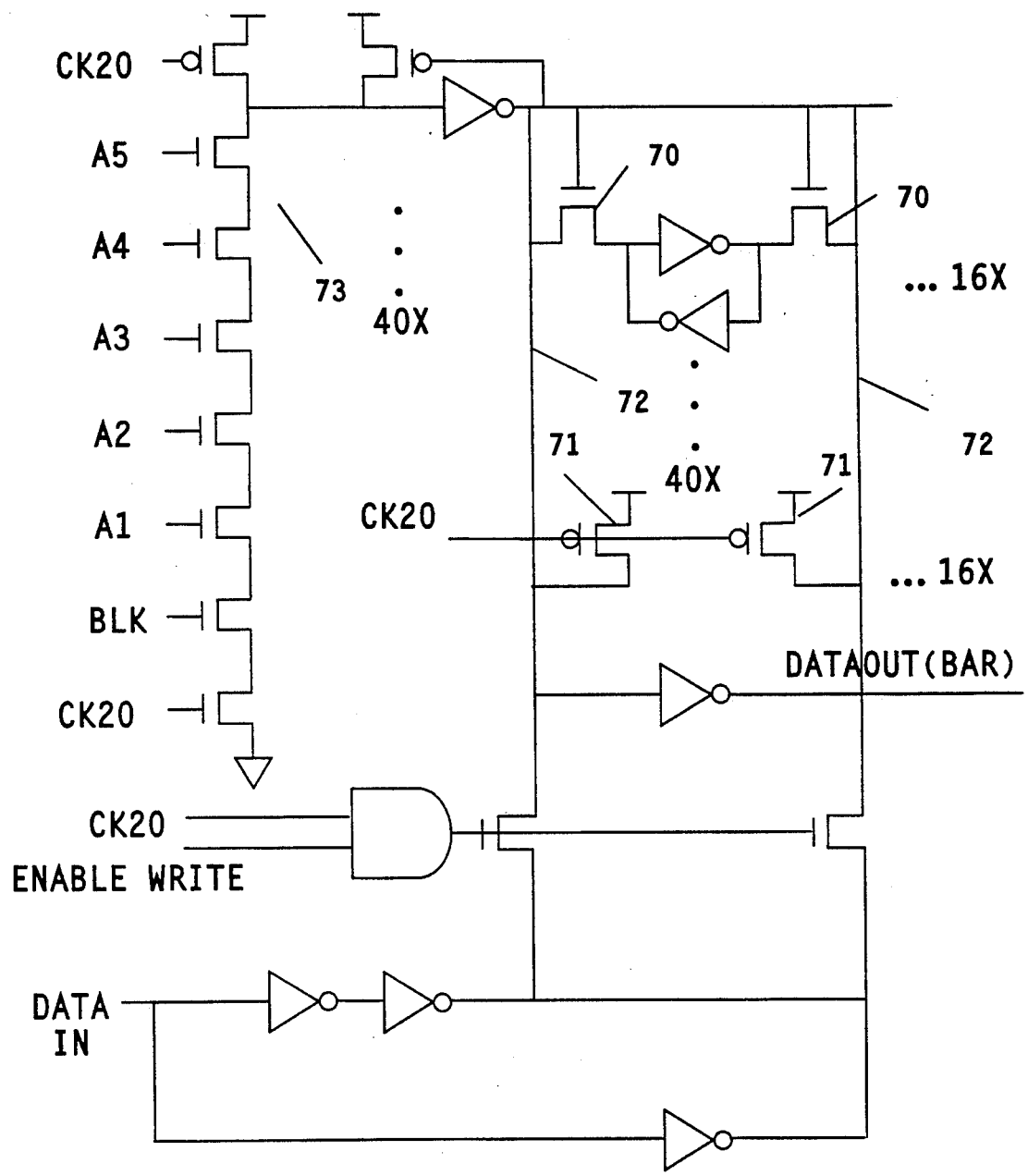
FIG. 4 is a schematic circuit diagram of the FIFO memory.

FIG. 4 is a conceptual depiction of the FIFO 41 and address decoder 52. A single address decoder is used because the addresses are multiplexed. Referring back to the timing diagram of FIG. 3, the address decoder and FIFO core 52 and 41 are precharged during CK20 low and the address is evaluated during CK20 high. The address decoding for the FIFO core 41 during CK10 high is for the MC side FIFO pointer address and during CK10 low is for the local side FIFO pointer address.

As depicted in FIG. 4, because of precharging, the address decode circuit AND gate structure 73 does not include complementing P-channel devices. Since the P-channel devices in a CMOS gate generally occupies three times the area of the N-channel devices a substantial reduction of required silicon area is achieved.

Also, only N-channel transistors 70 are used for the address decode so that small basic memory cell in a mirrored layout can be utilized to further reduce the required silicon area. The precharge transistors 71 are turned on during CK20 low to precharge the bit lines 72. Thus, the read out of a ONE is instantaneous. Additionally, a ZERO is the fastest state the can be read from a CMOS memory so the FIFO depicted in FIG. 4 provides a small latency time to access data.

The invention has now be described with reference to a preferred embodiment. Alternatives and substitutions will now be apparent to persons of skill in the art. In particular, while the invention is particular useful when interfaced to a Micro Channel bus the basic principle of the time multiplexed FIFO is applicable for any two bus protocols using asynchronous timing signals which may be derived from the multiplexing clock. Accordingly, it is not intended to limit the invention except as provided by the appended claims.

What is claimed is:

1. A bus master having a first clock signal input for interfacing an asynchronous system bus and an asynchronous local bus comprising:
    means for outputting a read/write control signal;
    a FIFO memory having a single data input port, a single data output port, and a control port for receiving said read/write control signal, with said input port enabled when said read/write control signal is asserted and said output port enabled when said read/write control signal is negated;
    an internal system side bus;
    an internal local side bus;
    a FIFO input data MUX having first and second input port coupled to said internal system side and local side buses respectively, an output port coupled to the input port of said FIFO memory, and a control port for receiving a second clock signal derived by dividing said first clock signal and comprising a continuous series of contiguous, alternating high and low clock phases of equal duration, said FIFO input data MUX for coupling its first input port to its output port during high second clock signal phases and for coupling its second input port to its output port during low second clock signal phases;
    a FIFO output data MUX having first and second output ports coupled to said internal system side and local side buses respectively, an input port coupled to the output port of said FIFO memory, and a control port for receiving said second clock signal, said FIFO output data MUX for coupling its first output port to its input port during high second clock signal phases and for coupling its second output port to its input port during low second clock signal phases;
    means for generating system bus control signals, congruent to said second clock signal, for controlling the bus cycles of the asynchronous system bus to facilitate the transfer of data between said FIFO memory and the system bus during a signal selected high second clock signal phase;
    means for generating local bus control signals, congruent to said second clock signal, for controlling the bus cycles of the asynchronous local bus to facilitate the transfer of data between said FIFO memory and the local bus during a single selected low second clock signal phase so that accesses to the FIFO by the system and local buses can be interleaved to simultaneously transfer data between said FIFO and said local buses at high transfer rates.

2. The bus master system of claim 1, wherein said means for outputting a read/write control signal comprises a DMA controller.

3. The bus master of claim 1, wherein said means for generating system bus control signals is coupled to receive a third clock signal derived by dividing said first clock signal.

4. The bus master of claim 1, wherein at least one of said means for generating system bus control signals and said means for generating local bus control signals is coupled to receive a third clock signal derived by dividing said first clock signal.

5. A communication pathway system between a local interface bus and a main system bus, with the main system bus having a maximum data transfer rate equal to a predetermined value, comprising:
    a FIFO memory implemented in CMOS;
    a multiplexing system, coupled to receive a multiplexing clock signal of a first frequency equal to twice the predetermined value, for alternately providing read/write access to the FIFO memory to the local interface bus or the main system on alternate phases of the multiplexing clock signal; and
    means for generating bus control signals, congruent to said demultiplexing clock signal, to simultaneously transfer data between said FIFO memory and the system and local buses at data rates up to the predetermine value;
    a single, shared address decoder, coupled to a precharge clock signal in phase with said multiplexing clock signal and having a frequency equal to twice said first frequency, for selecting a word in said FIFO memory in response to an address provided to the decoder, said decoder including a precharge p-channel transistor turned on by each low phase of the precharge clock signal and coupled to an AND gate structure;
    said AND gate structure coupled to the received address, and consisting only of N-channel transistors and activated on each high phase of said precharge clock signal.

6. A communication pathway system between a local interface bus and a main system bus, with the main system bus having a maximum data transfer rate equal to a predetermined value, comprising:
    a FIFO memory;
    a multiplexing system, coupled to receive a multiplexing clock signal of a first frequency equal to twice the predetermined value, for alternately providing read/write access to the FIFO memory to the local interface bus or the main system on alternate phases of the multiplexing clock signal; and
    means for generating bus control signals, congruent to said multiplexing clock signal, to simultaneously transfer data between said FIFO memory and the system and local buses at data rates up to the predetermine value;
    a single, shared address decoder, coupled to a precharge clock signal in phase with said multiplexing clock signal and having a frequency equal to twice said first frequency, for selecting a word in said FIFO memory in response to an address provided to the decoder, said decoder including a precharge p-channel transistor turned on by each low phase of the precharge clock signal and coupled to an AND gate structure;
    said AND gate structure coupled to the received address, and consisting only of N-channel transistors and activated on each high phase of said precharge clock signal;
    only N-channel address decoding transistors facilitate a mirrored memory cell layout to reduce area; and
    p-channel precharge transistors to precharge a pair of bit lines when on each low phase of said precharge clock signal to provide instantaneous access to a logic high state so that access time is reduced.

* * * * *

UNITED STATES PATENT AND TRADEMARK OFFICE
CERTIFICATE OF CORRECTION

PATENT NO. : 5,305,319
DATED : April 19, 1994
INVENTOR(S) : Richard Sowell

It is certified that error appears in the above-indentified patent and that said Letters Patent is hereby corrected as shown below:

Column 5, line 46, signal should read single

Column 6, line 15, demultiplexing should read multiplexing

Column 6, line 18, predetermine should read predetermined

Column 6, line 47, predetermine should read predetermined

Signed and Sealed this

Second Day of August, 1994

*Attest:*

BRUCE LEHMAN

*Attesting Officer*  Commissioner of Patents and Trademarks